Sept. 21, 1926.  1,600,239
D. J. McCARTHY
OPTICAL SYSTEM
Filed Oct. 6, 1924
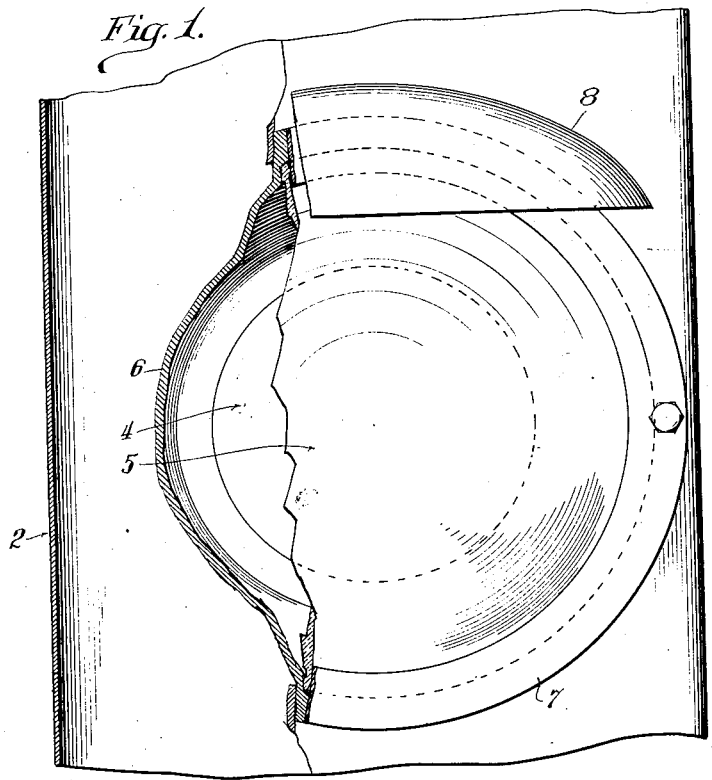
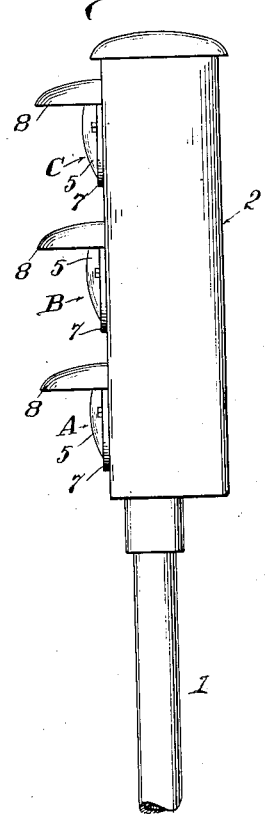
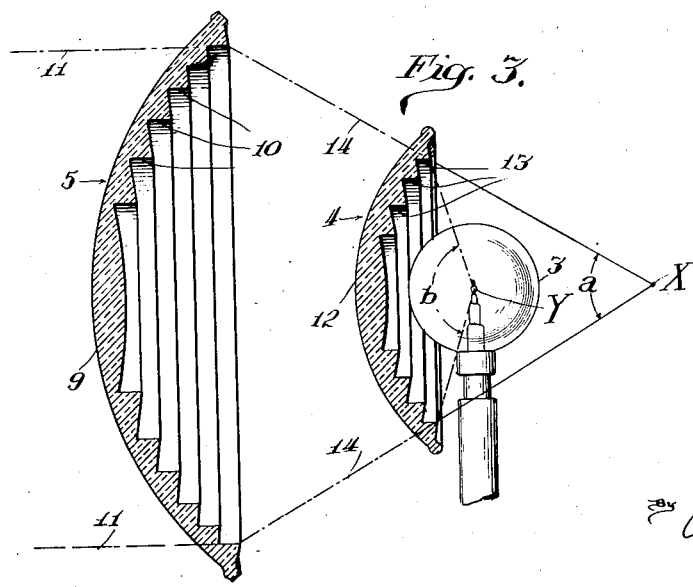
Inventor
Daniel J. McCarthy
By Barnett & Truman
Attorneys Patented Sept. 21, 1926.

1,600,239

UNITED STATES PATENT OFFICE.

DANIEL J. McCARTHY, OF ELGIN, ILLINOIS, ASSIGNOR TO CHICAGO RAILWAY SIGNAL & SUPPLY COMPANY, OF CARPENTERSVILLE, ILLINOIS, A CORPORATION OF ILLINOIS.

OPTICAL SYSTEM.

Application filed October 6, 1924. Serial No. 741,993.

This invention relates to an optical system adapted for use in visible railway signals, of the type showing a colored light when energized, either by night or day.

Since these lights may be burning practically constantly, it is desirable to use a small powered light, of low voltage, for purposes of economy and to give long life to the light. A system of lenses is employed to collect the light rays and project them as substantially parallel rays from the light. It is impractical to employ a mirror or other reflecting medium behind the source of light, since this will reflect back the light from headlights shining thereinto, thus illuminating the signal when the signal should be dark, and giving a so-called "phantom indication" causing confusion and danger. It is therefore necessary to collect as much of the light as possible from one side of the lamp, or other source of light, by means of suitably designed and positioned lenses.

According to the present invention, a pair of lenses of different diameters, each having a smooth outer convex surface and an inner concave surface corrugated, preferably spherically, to provide prismatic zones of the Fresnel lens type, are so positioned with relation to a source of light that the smaller inner lens will collect a comparatively large angle of the light rays emanating from the light source, and converge these rays towards the larger outer lens along lines which correspond with the lines converging at the focus of the outer lens. The rays are then projected in substantially parallel relation from the outer lens as a beam of light. Preferably the inner lens is colored, and the outer lens clear, for reasons explained in detail hereinafter.

The invention will be better understood from the following detailed description of one approved form of the apparatus.

In the accompanying drawings:

Fig. 1 is a front elevation of one of the signal units, the view being partially broken away to show the interior construction.

Fig. 2 is a side elevation, on a smaller scale, of one of the signal towers embodying signal units of this type.

Fig. 3 is a central vertical section, partly diagrammatic, illustrating the construction and relationship of the two lenses and the lamp or other source of light.

At 1 is indicated a portion of a signal tower, carrying at its upper end a housing 2, in which are positioned a series A, B and C of signal lights. These lights may all be of the same construction, with the exception that different colored lenses are used in the several lights, so that when illuminated, they will give forth light rays of different colors, such as red, green and yellow.

A suitable source of light, for example, the electric bulb 3, is positioned within the housing 2. A pair of relatively spaced lenses 4 and 5 are positioned in front of this lamp, and supported in a suitable casing 6, within the housing 2. The outer lens 5 may be held in place by a cover ring 7, and a shield 8 is usually positioned above each signal unit to concentrate the light and avoid confusing reflections.

The outer lens 5 has a smooth outer convexed surface 9, and an inner concaved surface provided with a series of spherical ridges or corrugations 10. The effect of this conformation is to cause all of the rays of light emanating from a focus, such as X, and impinging upon the inner surface of the lens to be projected from the outer convexed surface in parallel rays, as indicated at 11. Similarly, the smaller inner lens 4 has a smooth convexed outer surface 12, and a spherically corrugated concaved inner surface 13. The conformation of this lens 4 is such that all light rays emanating from a focus Y and impinging upon the inner concaved surface of the lens will be projected from the outer concaved surface along divergent lines 14, which when the lenses are properly positioned relative to one another and to the light source 3, will coincide with the paths of the light rays from focus X to lens 5. In other words, with the parts positioned as shown in Fig. 3, the inner lens 4 will have a virtual focus at the point X coinciding with the actual focus of outer lens 5.

It will be noted, that if only the outer lens 5 were used, and the source of light 3 were positioned at the focus X, of the total light emitted by lamp 3, only the portions comprised within the angle $a$ would be caught by the lens 5 and projected toward the observer. When the inner lens 4 is added, and the source of light positioned at the focus Y, all of the light comprised within the angle $b$ (which it will be noted is considerably larger than angle $a$), will be caught by inner lens 4 and refracted so that the light rays travel along the lines 14 and apparently come from the focal point X, so that when again reflected by lens 5 they will proceed toward the observer as substantially parallel light rays 11. In this way, a much larger percentage of the light sent out from source 3 is utilized. Consequently a smaller and less powerful lamp may be used at point Y, to secure the same results as would be attained by a larger, more powerful lamp, at point X.

One of the lenses 4 or 5 is made of colored glass, so that the light beam sent out from the system will give the desired color signal. It is preferable to have the inner lens colored, rather than the outer lens. Much of the light which penetrates the outer lens from without will be reflected back by the smooth outer surface of the inner lens, and since this light does not penetrate the colored inner lens, it will not be colored when again thrown from the outer lens to the observer, and will not give a false signal. Furthermore, the outer lens 5 is more subject to breakage than the inner lens, and the clear glass lenses are less expensive than the colored ones.

A somewhat similar optical system has heretofore been used for signal work, in which the inner lens is corrugated on its outer convexed surface, and smooth on the inner concaved surface. The system disclosed in this present application is an improvement, and has certain distinct advantages over this prior system. In this improved system, the outer lens must be one of longer focus, and therefore there will be less refracting loss. The outer lens also has a greater curvature than the outer lens heretofore used, and will consequently reflect away more light than is thrown thereagainst from outside sources, thus decreasing the light that enters the system from without, and decreasing the "phantom indication". The smooth outer surface of the inner lens also reflects back more of such light as does penetrate the outer lens, thus further minimizing the "phantom indication". Less spherical corrugations, or lens sections, are required when positioned on the concaved surface of the lens than when positioned on the outer convexed surface, and since the addition of each spherical corrugation involves an additional light loss, the type of lens here shown is more efficient than the one heretofore used. It is more convenient and economical to make the corrugations on the inner surface of this lens similar to those on the larger outer lens. The corrugations on the lens are better protected against breakage and the lens is easier to handle when these corrugations are positioned within the concaved inner surface of the lens. All of these advantages make the optical system disclosed more efficient and more economical than those heretofore in use.

I claim:

1. In optical apparatus the combination of a light source, and a doublet of condensing lenses the outer faces of both of which are smooth and convex and the inner faces recessed and corrugated to provide a series of concentric prismatic zones.

2. In optical apparatus, a light source and a doublet of condensing lenses, the outer faces of each of which are smooth and convex and the inner faces recessed and formed with corrugations having convex surfaces, to provide concentric prismatic zones.

3. A light signal comprising, in combination, a lamp, a pair of lenses of different diameters arranged in front of the lamp with the small lens close to said lamp, both of which lenses have smooth convex outer faces and inner faces corrugated to provide a series of concentric double convex prismatic zones of the Fresnel type.

4. A light signal comprising, in combination, a lamp, a pair of lenses of different diameter arranged in front of the lamp with the small lens colored and close to the lamp and the larger lens of clear glass, both of which lenses have smooth convex outer faces and recessed inner faces to provide a series of concentric prismatic zones of the Fresnel type.

DANIEL J. McCARTHY.